(12) United States Patent
Zhao et al.

(10) Patent No.: US 12,210,144 B2
(45) Date of Patent: Jan. 28, 2025

(54) THREE-DIMENSIONAL FLUORESCENCE IMAGING SYSTEM COMPRISING SINGLE-OBJECTIVE LIGHT-SHEET MICROSCOPY

(71) Applicant: Wuhan Smartview Biotechnology Co., Ltd., Wuhan (CN)

(72) Inventors: Yuxuan Zhao, Wuhan (CN); Fang Zhao, Wuhan (CN); Peng Fei, Wuhan (CN)

(73) Assignee: WUHAN SMARTVIEW BIOTECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/661,705

(22) Filed: May 12, 2024

(65) Prior Publication Data

US 2024/0345375 A1    Oct. 17, 2024

Related U.S. Application Data

(63) Continuation-in-part of application No. PCT/CN2024/082135, filed on Mar. 18, 2024.

(30) Foreign Application Priority Data

Apr. 17, 2023 (CN) .......................... 202310402295.4

(51) Int. Cl.
G02B 21/00    (2006.01)
G01N 21/64    (2006.01)

(52) U.S. Cl.
CPC ..... G02B 21/0048 (2013.01); G01N 21/6458 (2013.01); G02B 21/0032 (2013.01);
(Continued)

(58) Field of Classification Search
CPC ............ G02B 21/0048; G02B 21/0032; G02B 21/0076; G01N 21/6458; G01N 21/6486; G01N 2021/6463; G01N 2201/105
See application file for complete search history.

(56) References Cited

U.S. PATENT DOCUMENTS

2016/0363750 A1* 12/2016 Hufnagel ............... G02B 21/02
2021/0325651 A1   10/2021 Tsia et al.
2023/0074006 A1    3/2023 Schwedt et al.

FOREIGN PATENT DOCUMENTS

CN    101339129 A    1/2009
CN    102841083 A    12/2012
(Continued)

*Primary Examiner* — Courtney D Thomas
(74) *Attorney, Agent, or Firm* — MATTHIAS SCHOLL P.C.; Matthias Scholl

(57) ABSTRACT

A three-dimensional fluorescence imaging system, including an illumination objective, a scanning lens group, a galvanometer, an illumination module, and a detection module. The scanning lens group includes a first scanning lens and a second scanning lens; main optical axes of the first scanning lens and the second scanning lens are orthogonal and confocal; a common focus of the first scanning lens and the second scanning lens is disposed on a central part of the galvanometer. The illumination module is configured to generate an illumination laser beam; the illumination laser beam passes through the scanning lens group and enters a rear pupil plane of the illumination objective, forming a light sheet having an inclination angle α projected onto an excitation plane of a sample to excite fluorescence; the excitation plane is diagonally intersected with a main optical axis of the illumination objective. The detection module includes an area array detector.

18 Claims, 3 Drawing Sheets

(52) U.S. Cl.
CPC . *G02B 21/0076* (2013.01); *G01N 2021/6463* (2013.01); *G01N 21/6486* (2013.01); *G01N 2201/105* (2013.01)

(56) References Cited

FOREIGN PATENT DOCUMENTS

| | | |
|---|---|---|
| CN | 203705345 U | 7/2014 |
| CN | 109407294 A | 3/2019 |
| CN | 109596588 A | 4/2019 |
| CN | 110836877 A | 2/2020 |
| CN | 111273433 A | 6/2020 |
| CN | 114113019 A | 3/2022 |

* cited by examiner

THREE-DIMENSIONAL FLUORESCENCE IMAGING SYSTEM COMPRISING SINGLE-OBJECTIVE LIGHT-SHEET MICROSCOPY

CROSS-REFERENCE TO RELATED APPLICATIONS

This application is a continuation-in-part of International Patent Application No. PCT/CN2024/082135 with an international filing date of Mar. 18, 2024, designating the United States, now pending, further claims foreign priority benefits to Chinese Patent Application No. 202310402295.4 filed Apr. 17, 2023. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of microimaging, and more particularly to a three-dimensional fluorescence imaging system comprising single-objective light-sheet microscopy.

Conventional light sheet fluorescence microscopes have a light sheet illumination light path and a fluorescence detection light path, and the two paths are orthogonal to each other and involve a detection objective and an illumination objective, respectively. The overall light path is complicated and difficult to construct. A light sheet microscope can couple the illumination and detection light paths into one path, and when employing one objective lens to simultaneously illuminate and detect the sample, the light sheet microscope is called a single-objective light sheet microscope.

However, the use of a single objective for simultaneous illumination and detection results in optical aberration due to the oblique intersection of the light sheet illumination light path and the fluorescence detection light path, and the involved single objective must be a high numerical aperture objective. To correct the optical aberration and realize perfect imaging in three-dimensional space, three objective lenses are often used for aberration-free remote focusing and oblique plane correction, which leads to a complicated imaging system with low applicability. In oblique plane correction, the secondary objective O2 and the tertiary objective O3 need to be placed at a certain inclination angle to correct the fluorescence signal generated by excitation of the tilted light sheet in the primary objective O1. As the inclination angle increases, the light collection efficiency of O3 decreases significantly. To ensure the throughput and resolution of the entire optical system, the primary objective is usually required to have a high numerical aperture (greater than 0.5), while a high numerical aperture objective generally means a higher magnification and a smaller field of view, thus limiting the field of view of the single-objective light sheet microscope.

All the time, the commercialization of the single-objective light-sheet fluorescence microscopy has been greatly limited by the fact that single-objective light-sheet fluorescence imaging systems cannot achieve in-situ magnification switching, and the sample cannot be observed at different magnifications. For example, a conventional co-axial imaging system includes a single objective light sheet, where a second objective and a third objective are coaxially disposed, thus lifting the limitation on the numerical aperture (NA) value of the illumination objective. However, although in situ magnification switching has been achieved, the system sacrifices the field of view and imaging speed. The two-dimensional imaging of the excitation plane can be achieved through stacking within one scanning cycle, while three-dimensional imaging requires sample displacement.

SUMMARY

To solve the above-mentioned disadvantages in the related art, the disclosure provides a three-dimensional fluorescence imaging system comprising single-objective light-sheet microscopy, aiming to continuously collect the projection of the excitation plane of a sample on the orthogonal plane of the main optical axis of an illumination objective, instead of the traditional perfect imaging of the excitation plane of the sample, and then perform three-dimensional reconstruction to obtain the three-dimensional fluorescence data of the sample. The disclosure omits two remote imaging objectives used for optical aberration correction, lifts the optical parameter limitations on the illumination objective, and conveniently achieves in-situ magnification switching. Therefore, the disclosure solves the existing technical problem of inability to achieve in-situ magnification switching caused by the strict optical parameter limitations on the three objectives due to the requirement of perfect imaging data of the excitation plane of the sample, or the technical problem of the slow imaging speed caused by the use of row by row exposure for in-situ magnification switching.

In one aspect, the disclosure provides a three dimensional fluorescence imaging system comprising single-objective light-sheet microscopy, the system comprising: an illumination objective, a scanning lens group for relay, a galvanometer, an illumination module, and a detection module;

the scanning lens group comprises a first scanning lens and a second scanning lens; main optical axes of the first scanning lens and the second scanning lens are orthogonal and confocal; a common focus of the first scanning lens and the second scanning lens is disposed on a central part of the galvanometer;

the illumination module is configured to generate an illumination laser beam; the illumination laser beam passes through the scanning lens group and enters a rear pupil plane of the illumination objective, forming a light sheet having an inclination angle α projected onto an excitation plane of a sample to excite fluorescence; the excitation plane is diagonally intersected with a main optical axis of the illumination objective, and an intersection angle of the excitation plane and the main optical axis of the illumination objective is an inclination angle θ of the light sheet;

the fluorescence emitted from the excitation plane of the sample is collected by the illumination objective, enters the scanning lens group in an opposite direction of an illumination light of the illumination module, and reaches the detection module for imaging, thus obtaining a projection of the excitation plane of the sample on an orthogonal plane of the main optical axis of the illumination objective; and the detection module comprises an area array detector.

In a class of this embodiment, the three-dimensional fluorescence imaging system comprising single-objective light-sheet microscopy further comprises a sample carrier; the sample carrier comprises an axial feeding system configured to drive the sample to move along an axis of the illumination objective; an axial position of the sample carrier or the illumination objective changes in a stepwise or continuous manner, and during a rotation period T of the galvanometer, an axial displacement L of the sample carrier or the illumination objective satisfies the following inequality:

$$L \le s * \sin\theta;$$

where, s represents a Rayleigh range of the light sheet.

In a class of this embodiment, under the action of the galvanometer, the excitation plane of the sample is scanned in a direction perpendicular to the main optical axis of the illumination objective; after the fluorescence is reversely scanned by the galvanometer, projections of the excitation plane of the sample on the orthogonal plane of the main optical axis of the illumination objective are obtained sequentially at a position of the area array detector of the detection module; and the projections are reconstructed and stacked, to yield a three-dimensional fluorescence image of the sample.

In a class of this embodiment, an angle of the galvanometer is changed stepwise or continuously, so that the excitation plane of the sample is scanned in the direction perpendicular to the main optical axis of the illumination objective, and a displacement d of the excitation plane of the sample corresponding to adjacent projections in the scanning direction satisfies the following condition:

$$d \in \left[\frac{h}{3\sin\theta}, \frac{h}{2\sin\theta}\right]$$

where, h represents a thickness of the light sheet.

In a class of this embodiment, a first lens is disposed between the scanning lens group and the illumination objective; the first lens is fixed in position relative to the scanning lens group for collimating a fluorescence signal collected by the illumination objective.

In a class of this embodiment, the illumination module comprises a collimated laser and a modulator; the modulator comprises a mask plate; the illumination laser is modulated by the modulator to form a predetermined light sheet; the predetermined light sheet passes through a dichroic mirror, is merged with a detection light path, and enters the scanning lens group.

In a class of this embodiment, the thickness of the light sheet is between 0.3 and 5 µm.

In a class of this embodiment, the detection module further comprises a second lens, and the area array detector is disposed on a focal plane of the second lens; and the area array detector is configured to obtain the projection of the excitation plane of the sample on the orthogonal plane of the main optical axis of the illumination objective in a time sequence of external control signals.

In a class of this embodiment, the three-dimensional fluorescence imaging system comprising single-objective light-sheet microscopy further comprises a depth of field extension module disposed between the scanning lens group and the second lens for expanding a depth of field of the light sheet along the axis of an illumination objective.

In a class of this embodiment, the depth of field extension module is a phase modulation mask, a spatial light modulator, an axial prism, or a prism group.

The following advantages are associated with the three-dimensional fluorescence imaging system comprising single-objective light-sheet microscopy of the disclosure. The three-dimensional fluorescence imaging system comprising single-objective light-sheet microscopy utilizes a galvanometer to scan and collect projection information. The projection of the excitation plane of a sample on the orthogonal plane of the main optical axis of the illumination objective, instead of the traditional perfect imaging of the excitation plane of the sample, is employed for three-dimensional reconstruction to obtain the three-dimensional fluorescence data of the sample. Only one illumination objective is employed for illumination and signal acquisition of the sample, and in combination with a three-dimensional reconstruction algorithm, the three-dimensional structural information of the biological sample can be quickly and conveniently obtained. More importantly, when a single objective is used for three-dimensional fluorescence imaging of the light sheet, the two remote imaging objectives used for correcting optical aberrations are omitted. The optical path construction is not limited by the magnification of the illumination objective, and when magnification switching is needed, an appropriate illumination objective can be directly used in situ, thus facilitating in-situ magnification switching without affecting imaging speed. The imaging speed is comparable to existing light sheet fluorescence microscopes and much higher than confocal microscopes, greatly expanding the application fields of light sheet fluorescence microscopes from scientific research imaging to commercial applications of detection and imaging.

Figure 1:
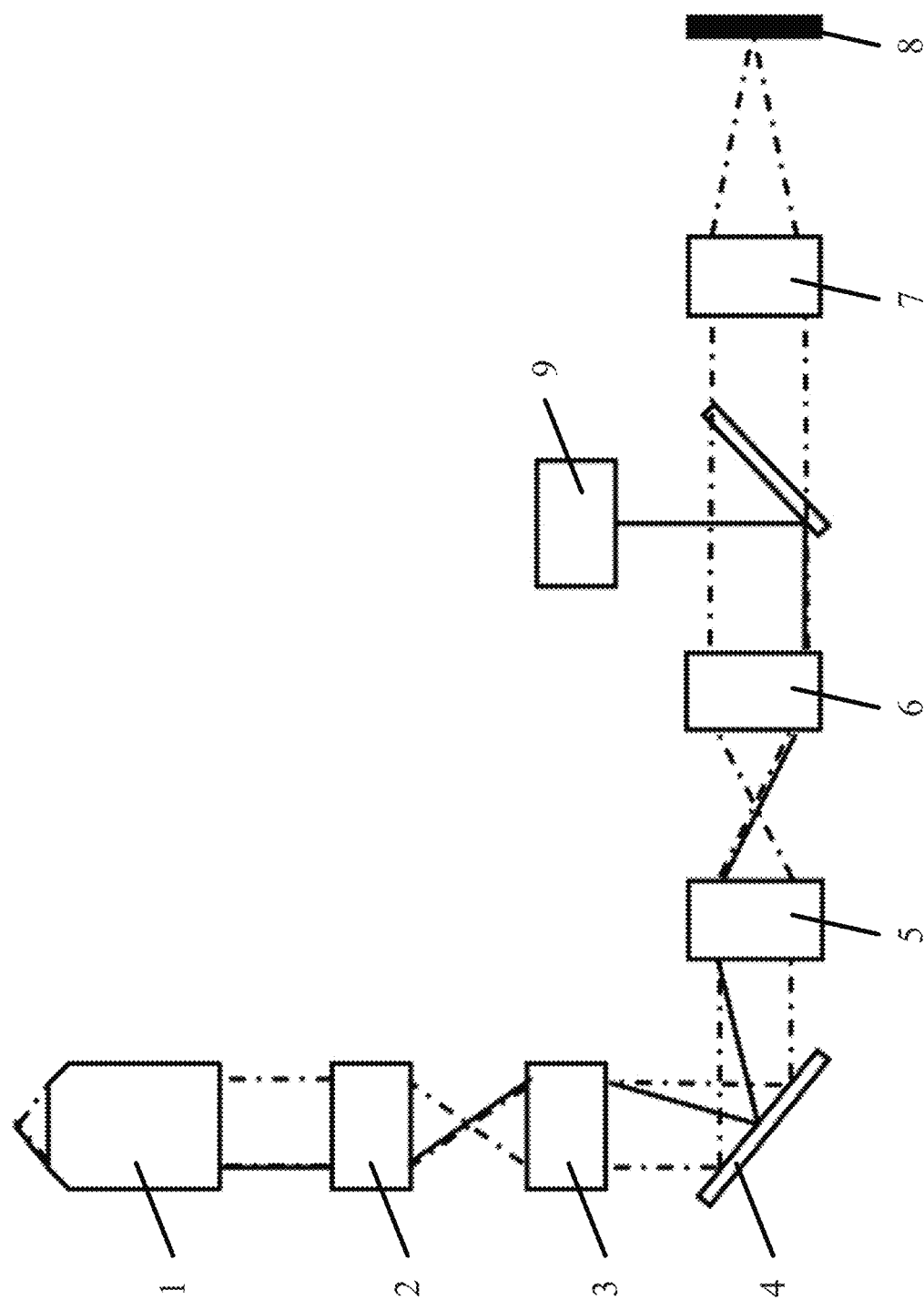
FIG. 1 is an optical path diagram of a three-dimensional fluorescence imaging system comprising single-objective light-sheet microscopy according to Example 1 of the disclosure.

In the drawings, the following reference numbers are used: 1. Illumination objective; 2. First lens; 3. First scanning lens group; 4. Galvanometer; 5. Second scanning lens; 6. Third lens; 7. Second lens; 8. Detector; 9. Illumination module; 10. Depth of field expansion module.

DETAILED DESCRIPTION

To further illustrate the disclosure, embodiments detailing a three-dimensional fluorescence imaging system comprising single-objective light-sheet microscopy are described below. It should be noted that the following embodiments are intended to describe and not to limit the disclosure.

One embodiment of the disclosure provides a three-dimensional fluorescence imaging system comprising single-objective light-sheet microscopy, comprising: an illumination objective, a scanning lens group for relay, a galvanometer, an illumination module, a detection module, and a sample carrier.

The scanning lens group comprises a first scanning lens and a second scanning lens; main optical axes of the first scanning lens and the second scanning lens are orthogonal and confocal; a common focus of the first scanning lens and the second scanning lens is disposed on a central part of the galvanometer;

the illumination laser beam passes through the scanning lens group and enters a rear pupil plane of the illumination objective, forming a light sheet having an inclination angle α projected onto an excitation plane of a sample to excite fluorescence; the excitation plane is diagonally intersected with a main optical axis of the illumination objective, and an intersection angle of the excitation plane and the main optical axis of the illumination objective is an inclination angle θ of the light sheet; and the fluorescence emitted from the excitation plane of the sample is collected by the illumination objective, enters the scanning lens group in an opposite direction of an illumination light of the illumination module, and reaches the detection module for imaging, thus obtaining a projection of the excitation plane of the sample on an orthogonal plane of the main optical axis of the illumination objective.

The detection module comprises an area array detector.

Under the action of the galvanometer, the excitation plane of the sample is scanned in a direction perpendicular to the main optical axis of the illumination objective; after the fluorescence is reversely scanned by the galvanometer, projections of the excitation plane of the sample on the orthogonal plane of the main optical axis of the illumination objective are obtained sequentially at a position of the area array detector of the detection module; the projections are reconstructed and stacked, to yield a three-dimensional fluorescence image of the sample.

The angle of the galvanometer is changed stepwise or continuously, so that the excitation plane of the sample is scanned in the direction perpendicular to the main optical axis of the illumination objective, and a displacement d of the excitation plane of the sample corresponding to adjacent projections in the scanning direction satisfies the following condition:

$$d \in \left[\frac{h}{3\sin\theta}, \frac{h}{2\sin\theta}\right]$$

where, h represents a thickness of the light sheet, and θ is an inclination angle of the light sheet with respect to the scanning direction.

By adjusting the rotation of the galvanometer to match the imaging speed of the detector, the displacement d of the excitation plane of the sample corresponding to adjacent projections in the scanning direction can be controlled to be within an appropriate range, so as to avoid the missed sampling caused by too sparse sampling or fluorescence information crosstalk caused by too dense sampling, thus improving the imaging quality after 3D reconstruction.

The imaging system of the disclosure utilizes the scanning lens group and the galvanometer to scan the excitation plane of the sample, and to collect the projection data instead of perfectly imaging to form a three-dimensional image, thus avoiding the need for perfect imaging of the excitation plane of the sample. In addition, the disclosure does not require the second and third objective lenses for correcting optical aberrations, eliminates the limitation on the numerical aperture (NA) value of the illumination objective, and can achieve in-situ magnification switching by utilizing appropriate illumination objectives. When there is a need for magnification switching, just to replace the current illumination objective with a desired one, other components in the detection path do not need to be replaced or re-registered, and the optical path does not need to be rebuilt.

However, because the 3D images are reconstructed using projections instead of perfect images, the crosstalk caused by projection should be prevented. If the projection shifts on the detector with the scanning of the excitation plane, projection crosstalk will cause misalignment in the process of restoring to the excitation plane of the sample, resulting in a failure of 3D reconstruction. In the disclosure, the galvanometer is applied to both the illumination path and the detection path. Because the excitation path and the detection path pass through the galvanometer in two opposite directions, the imaging position on the detector remains the same after scanning and de-scanning. The corresponding frame images are obtained in a chronological order, and the imaging of the detector changes continuously; the galvanometer periodically changes in a stepwise or continuous manner, within each change period of the galvanometer, the detector samples fluorescence signals activated by the light sheet in different positions thereof at a same time interval, which are generated by the galvanometer's scanning. This can effectively avoid the failure of 3D reconstruction caused by projection crosstalk, without the need for complex galvanometer control to scan multiple times to avoid projection crosstalk.

A first lens, preferably, a tube lens, is disposed between the scanning lens group and the illumination objective; the first lens is fixed in position relative to the scanning lens group for collimating a fluorescence signal collected by the illumination objective, so as to be compatible with objectives having different magnifications, thus improving the imaging quality of different objectives.

The illumination module is configured to generate an illumination laser beam; particularly, the illumination module comprises a collimated laser and a modulator; the modulator comprises a mask plate; the illumination laser beam is modulated by the modulator to form a predetermined light sheet; the predetermined light sheet passes through a dichroic mirror, is merged with a detection light path, and enters the scanning lens group. The thickness of the light sheet is between 0.3 and 5 µm. An excessively thick light sheet leads to severe projection crosstalk, while an excessively thin light sheet is detrimental to 3D imaging stacking. Moreover, the thinner the light sheet, the shorter the Rayleigh range, increasing the cost of axial scanning. During designing, it is necessary to consider the relationship between the Rayleigh range of the light sheet and the depth of field of the objective lens.

The detection module further comprises a second lens, and the area array detector is disposed on the focal plane of the second lens; and the area array detector is configured to obtain the projection of the excitation plane of the sample on the orthogonal plane of the main optical axis of the illumination objective in a time sequence of external control signals. Optionally, the second lens is a tube lens.

The imaging system further comprises a depth of field extension module disposed between the scanning lens group and the second lens. The depth of field extension module is a phase modulation mask, a spatial light modulator, an axial prism, or a prism group. The depth of field extension module is configured to expand the depth of field of the light sheet along the axis of the illumination objective, and expand the field of view of a single frame image, so that the detector can obtain more depth information in one exposure, thereby increasing the displacement step of the objective lens in its axis and reducing the number of axial scans.

The sample carrier comprises an axial feeding system configured to drive the sample to move along an axis of the illumination objective; an axial position of the sample carrier or the illumination objective changes in a stepwise or continuous manner, and during a rotation period T of the galvanometer, an axial displacement L of the sample carrier or the illumination objective satisfies the following inequality:

$$L \leq s*\sin\theta;$$

where, s represents a Rayleigh range of the light sheet, and θ is an inclination angle of the light sheet with respect to a scanning direction.

Example 1

As shown in FIG. 1, the example provides a three-dimensional fluorescence imaging system comprising single-objective light-sheet microscopy, comprising: an illumination objective, a scanning lens group for relay, a galvanometer, an illumination module 9, a detection module, and a sample carrier.

Illumination module: the laser light from a laser device is collimated and expanded as an illumination laser beam, which is emitted in parallel and reflected to the scanning lens group through a dichroic mirror.

Scanning lens group: the light emitted from the second scanning lens 5 is focused on the focal point of the galvanometer 4, passes through the first scanning lens 3 and the first lens 2 to reach the rear pupil plane of the illumination objective 1, and passes through the illumination objective 1, to form a light sheet in the sample plane and excite a sample fluorescence. The galvanometer is conjugated with the rear pupil plane of the illumination objective, and the light sheet scans horizontally in the sample plane with the vibration of the galvanometer 4. The parameters of the light sheet are determined by components along the detection light path. The fluorescence excited by the laser system is collected by the same illumination objective 1, passes through the first lens 2 and the first scanning lens 3, is descanned by the galvanometer 4, enters the second scanning lens 5 in the form of a stable scattered light, exits in parallel out of the second scanning lens 5, and passes through the dichroic mirror.

Detection module: The dichroic mirror reflects shorter wavelengths of laser, and transmits longer wavelengths of fluorescence. The parallel light is finally converged on the photosensitive surface of the area array detector 8 through a second lens 7 made of tube lenses.

The sample carrier (not shown in the drawings) comprises an axial (Z direction) feeding system driving the sample to move along the axis of the illumination objective; the axial position of the sample carrier or the illumination objective changes in a stepwise or continuous manner, and during a rotation period T of the galvanometer, the axial displacement L of the sample carrier or the illumination objective satisfies the following inequality:

$$L \leq s*\sin\theta;$$

where, s represents a Rayleigh range of the light sheet, and θ is an inclination angle of the light sheet with respect to a scanning direction.

In addition to feeding in the Z-direction, the sample carrier uses a two-dimensional displacement platform to quickly find the field of view.

When the three-dimensional fluorescence imaging system comprising single-objective light-sheet microscopy of the disclosure employs a 60×1.3 NA illumination objective 1, the width of the incident light of the light sheet into the objective 1 is 3.54 mm; the light sheet deviates from the center of the posterior pupil of the objective 1 by 2.13 mm; the inclination angle θ between the light sheet and the scanning direction is 54°; the thickness of the light sheet is 407 nm; the angle of the galvanometer is changed stepwise or continuously, and the velocity is determined by the thickness h and the inclination angle θ of the light sheet.

Example 2

Figure 2:
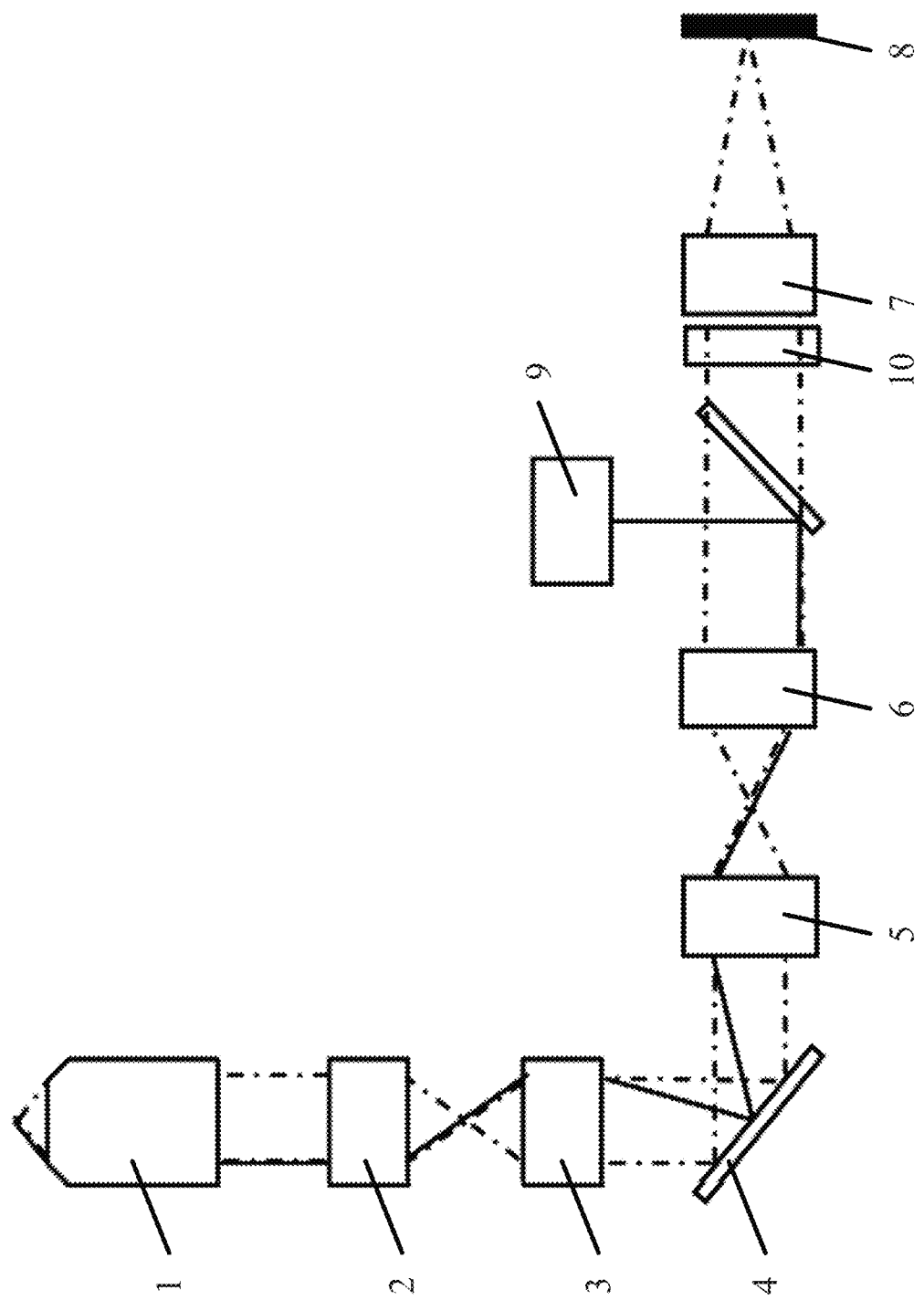
FIG. 2 is an optical path diagram of a three-dimensional fluorescence imaging system comprising single-objective light-sheet microscopy according to Example 2 of the disclosure.

As shown in FIG. 2, the example provides a three-dimensional fluorescence imaging system comprising single-objective light-sheet microscopy, comprising: an illumination module, a scanning and descanning module, a sample carrying module, a depth of field expansion module, and a detection module. The illumination module and the scanning and descanning module are similar to that in Example 1. The difference from Example 1 is that after passing through the second scanning lens 5, the parallel light emitted from the third lens 6 passes through the dichroic mirror and the depth of field expansion module, and then is focused by the second lens 7 on the detector 8. The depth of field expansion module 10 includes but is not limited to a conical lens, a diffractive optical element, a splitter prism, and so on.

When the three-dimensional fluorescence imaging system comprising single-objective light-sheet microscopy of the disclosure employs a 60×1.3 NA objective 1, due to the presence of the depth of field expansion module, the thickness of the light sheet on the detection side increases from 216 nm to 439 nm, and the field of view of a single frame image expands to 4080 nm, increased by about 7 times. The angle of the galvanometer is changed stepwise or continuously, and the velocity is determined by the thickness h and the inclination angle θ of the light sheet. Due to the expansion of the field of view of the single frame, the scanning step of the galvanometer becomes longer, which accelerates the scanning speed of the galvanometer. Simultaneously, the axial displacement step of the objective lens is increased, thus reducing the number of axial scans of the objective lens.

Example 3

Figure 3:
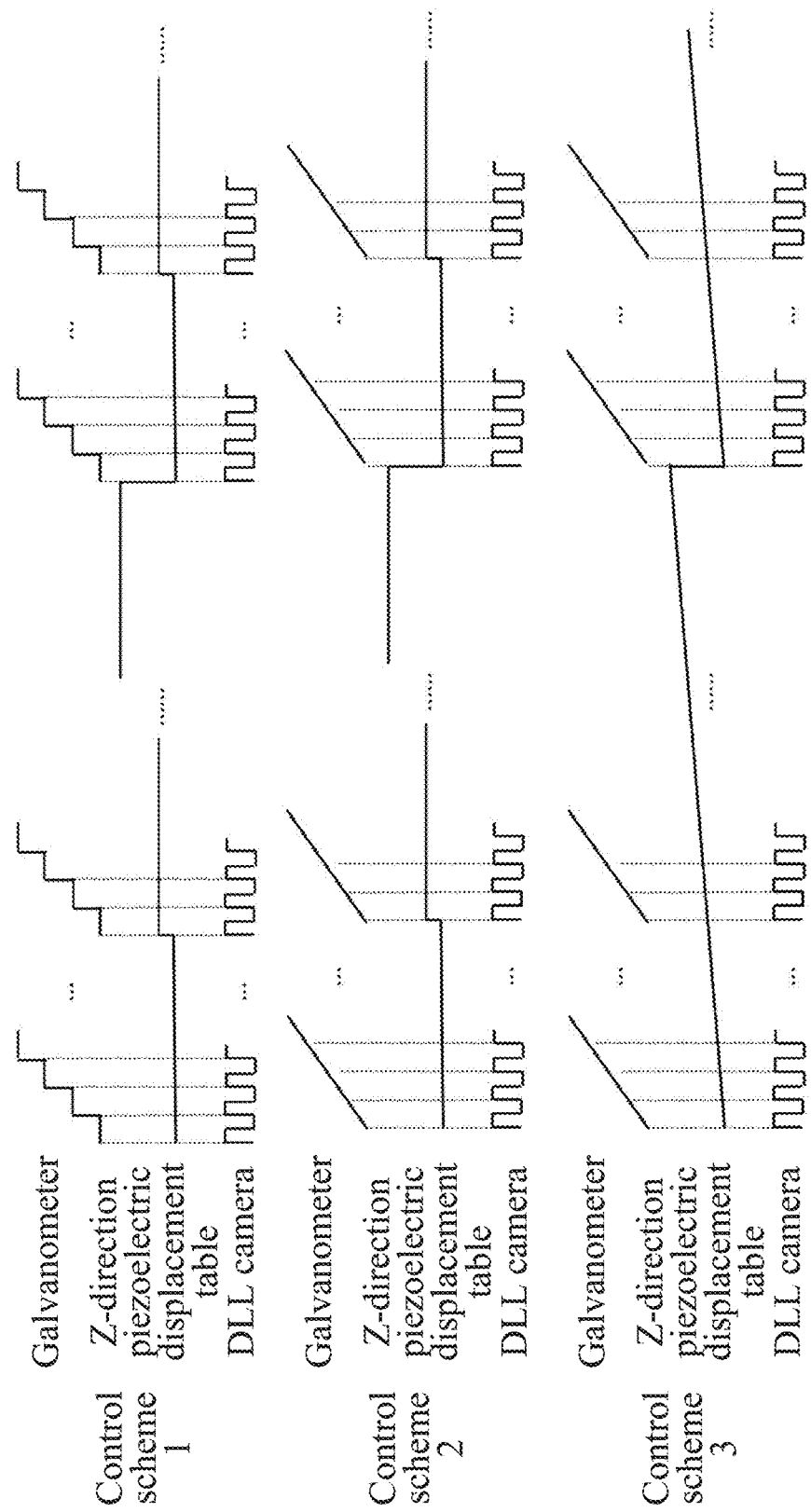
FIG. 3 is a schematic diagram of the external control signals according to one embodiment of the disclosure.

The control time sequence of the galvanometer, the sample carrier, and the area array detector of the three-dimensional fluorescence imaging system comprising single-objective light-sheet microscopy in Examples 1 and 2 is as shown in FIG. 3.

In the control scheme 1, the angle of the galvanometer changes stepwise or continuously to achieve lateral scanning.

The area array detector and the galvanometer synchronously acquire the projection of the excitation plane of the sample onto the orthogonal plane of the main optical axis of the illumination objective, and the displacement d of the excitation plane of the sample corresponding to adjacent projections in the scanning direction satisfies the following condition:

$$d \in \left[ \frac{h}{3\sin\theta}, \frac{h}{2\sin\theta} \right]$$

where, h represents a thickness of the light sheet, and θ is an inclination angle of the light sheet with respect to the scanning direction.

The sample carrier moves stepwise or continuously along the Z-direction to realize axial scanning, and the sample carrier moves by one step in the Z-direction for every cycle of rotation of the galvanometer.

In the control scheme 2, the angle of the galvanometer changes continuously to achieve lateral scanning.

The area array detector acquires projection of the excitation plane of the sample onto the orthogonal plane of the main optical axis of the illumination objective according to its own intrinsic timing sequence, and the displacement d of the excitation plane of the sample corresponding to adjacent projections in the scanning direction satisfies the following condition:

$$d \in \left[ \frac{h}{3\sin\theta}, \frac{h}{2\sin\theta} \right]$$

where, h represents a thickness of the light sheet, and θ is an inclination angle of the light sheet with respect to the scanning direction.

The sample carrier moves stepwise or continuously along the Z-direction to realize axial scanning, and the sample carrier moves by one step in the Z-direction for every cycle of rotation of the galvanometer.

In the control scheme 3, the angle of the galvanometer changes continuously to achieve lateral scanning.

The area array detector acquires projection of the excitation plane of the sample onto the orthogonal plane of the main optical axis of the illumination objective according to its own intrinsic timing sequence, and the displacement d of the excitation plane of the sample corresponding to adjacent projections in the scanning direction satisfies the following condition:

$$d \in \left[ \frac{h}{3\sin\theta}, \frac{h}{2\sin\theta} \right]$$

where, h represents a thickness of the light sheet, and θ is an inclination angle of the light sheet with respect to the scanning direction.

The sample carrier moves continuously along the Z-direction to realize axial scanning, and the sample carrier moves by one step in the Z-direction for every cycle of rotation of the galvanometer. The displacement L of the sample carrier in the Z direction is equivalent to the depth of field: L≤s*sin θ, where, s represents a Rayleigh range of the light sheet, and θ is an inclination angle of the light sheet with respect to a scanning direction.

It will be obvious to those skilled in the art that changes and modifications may be made, and therefore, the aim in the appended claims is to cover all such changes and modifications.

The invention claimed is:

1. A three-dimensional fluorescence imaging system comprising single-objective light-sheet microscopy, the system comprising:
   an illumination objective;
   a scanning lens group for relay;
   a galvanometer;
   an illumination module; and
   a detection module;
   wherein:
   the scanning lens group comprises a first scanning lens and a second scanning lens; main optical axes of the first scanning lens and the second scanning lens are orthogonal and confocal; a common focus of the first scanning lens and the second scanning lens is disposed on a central part of the galvanometer;
   the illumination module is configured to generate an illumination laser beam; the illumination laser beam passes through the scanning lens group and enters a rear pupil plane of the illumination objective, forming a light sheet having an inclination angle α projected onto an excitation plane of a sample to excite fluorescence; the excitation plane is diagonally intersected with a main optical axis of the illumination objective, and an intersection angle of the excitation plane and the main optical axis of the illumination objective is an inclination angle θ of the light sheet;
   the fluorescence emitted from the excitation plane of the sample is collected by the illumination objective, enters the scanning lens group in an opposite direction of an illumination light of the illumination module, and reaches the detection module for imaging, thus obtaining a projection of the excitation plane of the sample on an orthogonal plane of the main optical axis of the illumination objective; and
   the detection module comprises an area array detector.

2. The system of claim 1, further comprising a sample carrier, wherein the sample carrier comprises an axial feeding system configured to drive the sample to move along an axis of the illumination objective; an axial position of the sample carrier or the illumination objective changes in a stepwise or continuous manner, and during a rotation period T of the galvanometer, an axial displacement L of the sample carrier or the illumination objective satisfies the following inequality:

$$L \leq s * \sin\theta;$$

wherein, s represents a Rayleigh range of the light sheet.

3. The system of claim 1, wherein under the action of the galvanometer, the excitation plane of the sample is scanned in a direction perpendicular to the main optical axis of the illumination objective; after the fluorescence is reversely scanned by the galvanometer, projections of the excitation plane of the sample on the orthogonal plane of the main optical axis of the illumination objective are obtained sequentially at a position of the area array detector of the detection module; and the projections are reconstructed and stacked, to yield a three-dimensional fluorescence image of the sample.

4. The system of claim 2, wherein under the action of the galvanometer, the excitation plane of the sample is scanned in a direction perpendicular to the main optical axis of the illumination objective; after the fluorescence is reversely scanned by the galvanometer, projections of the excitation plane of the sample on the orthogonal plane of the main optical axis of the illumination objective are obtained sequentially at a position of the area array detector of the detection module; and the projections are reconstructed and stacked, to yield a three-dimensional fluorescence image of the sample.

5. The system of claim 3, wherein an angle of the galvanometer is changed stepwise or continuously, so that the excitation plane of the sample is scanned in the direction perpendicular to the main optical axis of the illumination objective, and a displacement d of the excitation plane of the sample corresponding to adjacent projections in the scanning direction satisfies the following condition:

$$d \in \left[\frac{h}{3\sin\theta}, \frac{h}{2\sin\theta}\right]$$

wherein, h represents a thickness of the light sheet.

6. The system of claim 4, wherein an angle of the galvanometer is changed stepwise or continuously, so that the excitation plane of the sample is scanned in the direction perpendicular to the main optical axis of the illumination objective, and a displacement d of the excitation plane of the sample corresponding to adjacent projections in the scanning direction satisfies the following condition:

$$d \in \left[\frac{h}{3\sin\theta}, \frac{h}{2\sin\theta}\right]$$

wherein, h represents a thickness of the light sheet.

7. The system of claim 1, wherein a first lens is disposed between the scanning lens group and the illumination objective; the first lens is fixed in position relative to the scanning lens group for collimating a fluorescence signal collected by the illumination objective.

8. The system of claim 2, wherein a first lens is disposed between the scanning lens group and the illumination objective; the first lens is fixed in position relative to the scanning lens group for collimating a fluorescence signal collected by the illumination objective.

9. The system of claim 1, wherein the illumination module comprises a collimated laser and a modulator; the modulator comprises a mask plate; the illumination laser beam is modulated by the modulator to form a predetermined light sheet; the predetermined light sheet passes through a dichroic mirror, is merged with a detection light path, and enters the scanning lens group.

10. The system of claim 2, wherein the illumination module comprises a collimated laser and a modulator; the modulator comprises a mask plate; the illumination laser beam is modulated by the modulator to form a predetermined light sheet; the predetermined light sheet passes through a dichroic mirror, is merged with a detection light path, and enters the scanning lens group.

11. The system of claim 9, wherein the thickness of the light sheet is between 0.3 and 5 µm.

12. The system of claim 10, wherein the thickness of the light sheet is between 0.3 and 5 µm.

13. The system of claim 1, wherein the detection module further comprises a second lens, and the area array detector is disposed on a focal plane of the second lens; and the area array detector is configured to obtain the projection of the excitation plane of the sample on the orthogonal plane of the main optical axis of the illumination objective in a time sequence of external control signals.

14. The system of claim 2, wherein the detection module further comprises a second lens, and the area array detector is disposed on a focal plane of the second lens; and the area array detector is configured to obtain the projection of the excitation plane of the sample on the orthogonal plane of the main optical axis of the illumination objective in a time sequence of external control signals.

15. The system of claim 13, further comprising a depth of field extension module disposed between the scanning lens group and the second lens for expanding a depth of field of the light sheet along the axis of an illumination objective.

16. The system of claim 14, further comprising a depth of field extension module disposed between the scanning lens group and the second lens for expanding a depth of field of the light sheet along the axis of an illumination objective.

17. The system of claim 15, wherein the depth of field extension module is a phase modulation mask, a spatial light modulator, an axial prism, or a prism group.

18. The system of claim 16, wherein the depth of field extension module is a phase modulation mask, a spatial light modulator, an axial prism, or a prism group.

* * * * *